Figure 1:
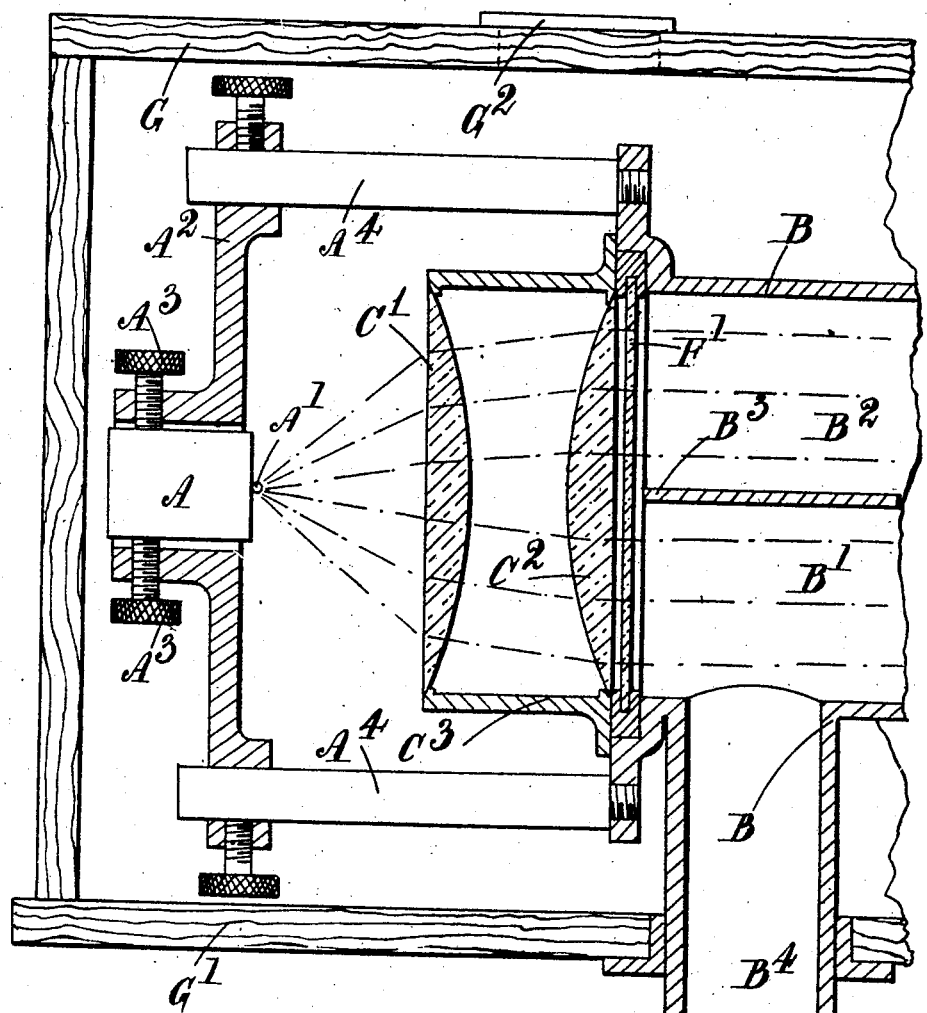

No. 878,456. PATENTED FEB. 4, 1908.
H. DARWIN.
AUTOMATIC APPARATUS FOR DETECTING SMOKE AND THE LIKE.
APPLICATION FILED DEC. 6, 1907.

3 SHEETS—SHEET 1.

No. 878,456. PATENTED FEB. 4, 1908.
H. DARWIN.
AUTOMATIC APPARATUS FOR DETECTING SMOKE AND THE LIKE.
APPLICATION FILED DEC. 6, 1907.
3 SHEETS—SHEET 2.
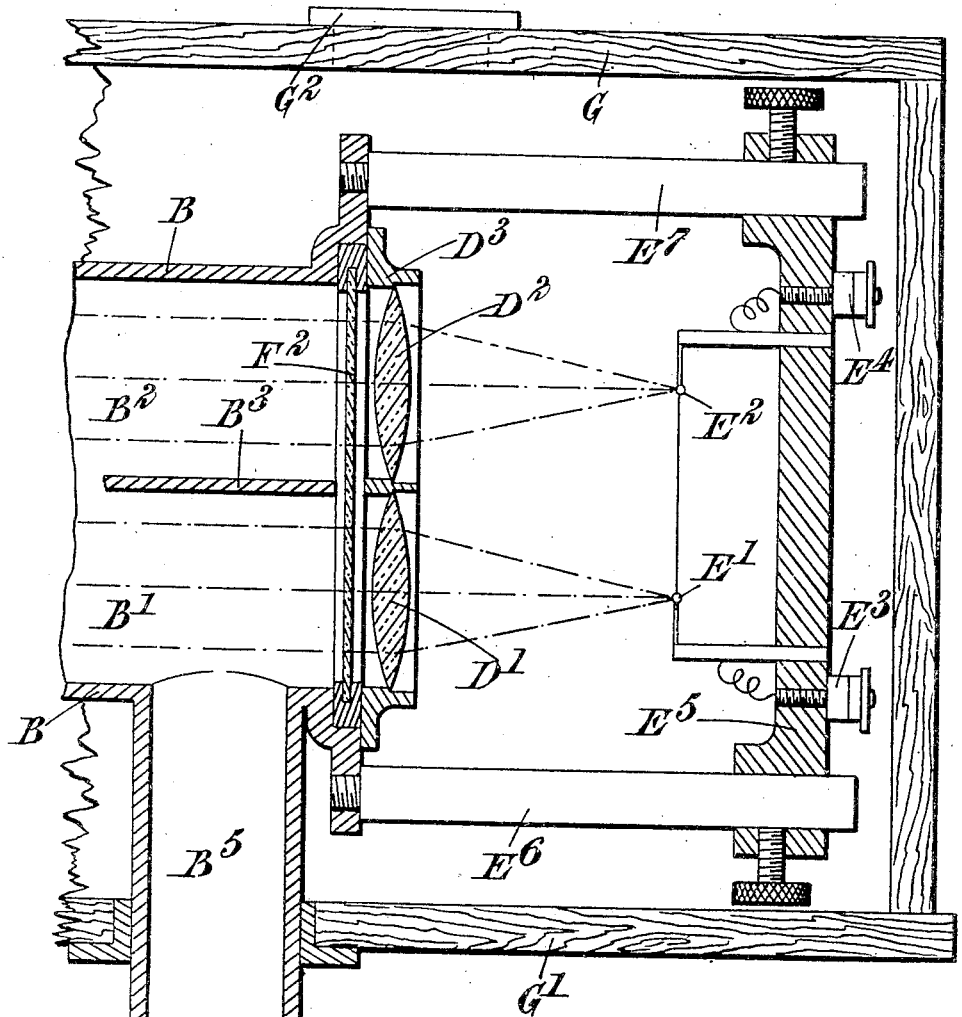
Fig. 1ª.
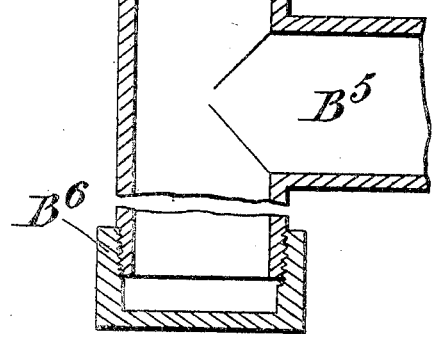

No. 878,456. PATENTED FEB. 4, 1908.
H. DARWIN.
AUTOMATIC APPARATUS FOR DETECTING SMOKE AND THE LIKE.
APPLICATION FILED DEC. 6, 1907.
3 SHEETS—SHEET 3.
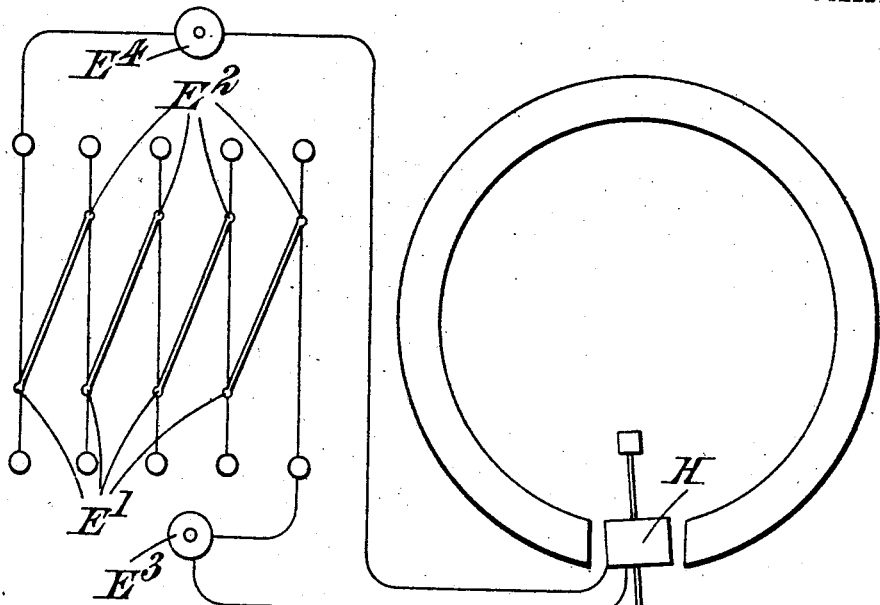
Fig. 2.
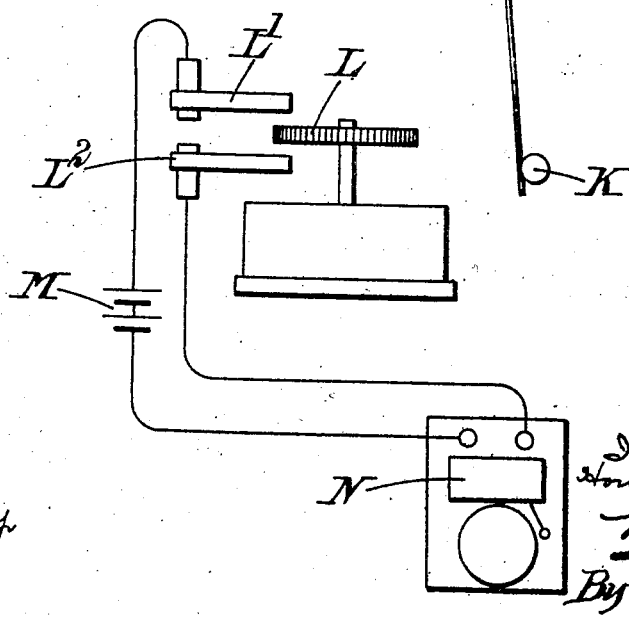

UNITED STATES PATENT OFFICE.

HORACE DARWIN, OF CAMBRIDGE, ENGLAND.

AUTOMATIC APPARATUS FOR DETECTING SMOKE AND THE LIKE.

No. 878,456.

Specification of Letters Patent.

Patented Feb. 4, 1908.

Application filed December 6, 1907. Serial No. 405,456.

*To all whom it may concern:*

Be it known that I, HORACE DARWIN, a subject of the King of England, residing at Cambridge, in England, have invented certain new and useful Automatic Apparatus for Detecting Smoke and the Like, of which the following is a specification.

The object of this invention is to give warning automatically of the smoky condition of a flue or chimney, by causing a bell to be rung or other signal to be operated as soon as the smoke has become more dense than is permissible.

Alarm signal apparatus according to this invention, comprises a source of luminous or thermal radiation, the radiation from the source being made to traverse a column of the smoke to be tested before falling upon devices sensitive to radiation. The said sensitive devices are so connected with a suitable relay that the relay is brought into operation and causes a signal to be given as soon as the proportion or percentage of incident radiation absorbed by the column of smoke exceeds a certain predetermined value.

In order to eliminate uncertainties which might arise from variations in the intensity of the source of radiation, it is preferred to allow two beams from the same source to fall upon the said sensitive devices the disposition of the apparatus being such that one only of the beams has traversed the smoke-column while the effects produced upon the sensitive devices by the two beams are opposed to one another. The adjustments of the apparatus may then be so made that when the mutually opposing influences of the two beams just balance and counteract one another, the relay is not brought into action while as soon as that beam which has not passed through the smoke column exerts a predominating influence the relay is brought into action and causes a signal to be given. That portion of chimney-smoke which lies in the path of the radiant beam aforesaid or alternatively in the path of one of the two radiant beams, and which has been referred to as the smoke-column may be momentarily contained in a specially constructed chamber which forms part of the alarm signal apparatus and through which smoke from the chimney is made to circulate. Or the smoke-column may consist of smoke within the chimney or flue the source of radiation and devices sensitive to radiation being suitably disposed with respect to the walls of the chimney.

In apparatus according to this invention it is advantageous by means of lenses or mirrors to render parallel the beam or beams which have proceeded from the source of radiation so that for example that beam which traverses the smoke-column is approximately a parallel beam while the beam or beams are preferably converged by means of lenses or mirrors upon the sensitive devices.

In a convenient construction according to this invention the source of radiation is of high intrinsic brightness, the glowing filament of a Nernst electric lamp having been found to be suitable. The radiation from the said source is rendered approximately parallel by passing through a condensing lens and is then caused to pass lengthwise through a long box which is divided by a lengthwise partition into two compartments. One of these compartments hereinafter called the air-chamber contains only atmospheric air while the other compartment hereinafter called the smoke-chamber contains smoke from the chimney or flue to be tested, the smoke being caused to circulate from the chimney to the smoke-chamber, through the smoke-chamber and finally either back to the chimney or to the outer air. The smoke is preferably cooled before entering the smoke-chamber and such cooling is conveniently effected by causing the smoke after leaving the chimney to pass downwards through a pipe cooled by water. The smoke exhausted from the smoke-chamber may then be led back into the chimney at a point lower than that at which the pipe supplying the smoke-chamber leaves the chimney. A circulation of smoke through the smoke-chamber is thus promoted and pumping devices for maintaining a circulation of the smoke are in some cases rendered unnecessary.

At the end of the aforesaid long box remote from the source of radiation two converging lenses are so placed that through one of the lenses passes the radiant beam which has traversed the smoke-chamber while through the other lens passes the radiant beam which has traversed the air-chamber. By means of these two converging lenses, two separate images of the source of radiation are formed and a thermo-pile is so placed that one of the images is focused upon one set of junctions while the second of the images is similarly focused upon one set of junctions of a second thermo-pile. The two thermo-piles are joined in simple series with one another and with a galvanometer, the order of the connections being such that the electromotive forces arising from the heating of the thermo junctions by the two images are opposed to one another.

When a glowing Nernst lamp filament or other narrow body is used as the source of radiation, the thermo-piles are preferably of linear form, that is to say in each thermo-pile the junctions which are to receive the radiation are arranged in a straight line and the corresponding image of the source of radiation is projected so as to cover them.

The deflectable member of the galvanometer carries a projecting boom which is swept around in one or other direction according to the direction of the current which passes through the galvanometer, that is to say according as the heating effect of the one or the other image of the radiant source produces the predominant electromotive force in the circuit.

By suitably controlling the two radiant beams as for example by introducing an adjustable diaphragm in the path of that beam which traverses the air-chamber the apparatus can be so adjusted that the electromotive forces arising from the two thermo-piles will just balance and counteract one another when the denseness of the smoke within the smoke chamber is such as corresponds to the greatest permissible denseness of smoke in the chimney. In this case it is evident that the electromotive force due to the effect of that radiant beam which has passed through the air-chamber will be predominant when and only when the permissible denseness of smoke in the chimney is exceeded. As soon as the galvanometer boom is deflected even slightly in the direction corresponding to an excessive denseness of smoke it causes a relay to be actuated and a signal to be given. For example a relay may be used of which a description was recently published. In this case the galvanometer boom when deflected in the direction corresponding to excessive smoke-density becomes engaged in suitably formed teeth upon the periphery of a wheel which is kept slowly rotating by clockwork. Once the boom has become engaged with such a wheel the boom follows the peripheral motion of the wheel for the greater part of one revolution and after that the boom is free to recede from the wheel or to become once more engaged with the teeth of the wheel according to the direction of the current which is at that moment flowing through the galvanometer. While the galvanometer boom is engaged with the teeth of the rotating wheel as aforesaid it is caused to rub against two spring-controlled strips or brushes so as to close an independent electric circuit and thus cause a bell to be rung or other signal to be given. To enable the galvanometer boom when engaged with the teeth of the wheel to follow the peripheral motion of the wheel without damage to the suspension of the galvanometer the boom is connected by a pivot to the deflectable member of the galvanometer the axis of the pivot being perpendicular to the axis of freedom of the deflectable member. The galvanometer boom is moreover controlled for example by a weight in such manner that as soon as disengaged from the teeth of the aforesaid wheel the boom turns about the pivot until such turning is arrested by a definite stop.

It is preferable to maintain throughout the smoke-circulation and especially within the smoke chamber a pressure slightly below that of the atmosphere the aforesaid condensing and converging lenses being so placed that their cells very nearly but not quite close the respective ends of the smoke-chamber and air-chamber. In this case it is evident that atmospheric air will enter slowly through the chinks between the ends of the chambers and the cells of the lenses and will thus hinder the deposition of soot from the lenses. When atmospheric air is thus drawn into the apparatus past the lenses it is desirable that such air should be filtered so that it may not be charged with coal-dust or the like which would form deposits upon the lenses. Filtration of the air may be effected for example by inclosing in a dust-tight box a portion of the apparatus comprising the source of radiation lenses, smoke chamber, air-chamber and thermo-piles the said box being provided with a window or windows of a material such as felt.

In the accompanying drawings Figures 1 and 1ª is a sectional elevation showing essential parts of one form of apparatus constructed according to this invention and Fig. 2 is a diagrammatic view of the electrical circuits and connections.

Like parts are indicated by like reference letters in the two figures.

In Fig. 1 and 1ª A is a Nernst lamp whereof the filament $A^1$ when rendered incandescent the filament $A^1$ when rendered incandescent the lamp A is used as a source of radiation the lamp A being adjustably supported by a bracket $A^2$ provided with pinching screws $A^3$. The bracket $A^2$ is in turn carried by supports $A^4$ fixed to the box or body B of the apparatus.

$C^1$ $C^2$ are lenses forming a condensing system and are mounted in a cell $C^3$ which is attached to the body B.

$B^3$ is a diaphragm or partition by which the body B is divided lengthwise into the smoke-chamber $B^1$ and the air-chamber $B^2$.

$B^4$ is a pipe by which smoke can enter the smoke-chamber $B^1$ and $B^5$ is a pipe by which the smoke can leave the smoke-chamber. The smoke before entering the smoke-chamber by the pipe $B^4$ is preferably cooled for example by causing it to descend through a pipe externally cooled by water. The pipe $B^5$ may conveniently lead back to the chimney or flue whence the smoke sample was derived. When a sufficient circulation of smoke through the smoke-chamber cannot be secured by gravity in the manner hereinbefore mentioned a fan steam ejector or other like device is introduced into the course of the pipe $B^5$.

$D^1 D^2$ are two converging lenses mounted in a common cell $D^3$ which is attached to the body B.

$E^1 E^2$ are two sets of thermo-electric junctions the arrangement of which is hereinafter described in connection with Fig. 2.

$E^3 E^4$ are terminals in electrical connection with the respective ends of the thermo-electric system $E^1 E^2$.

$E^5$ is an insulating piece which carries the thermo-electric system $E^1 E^2$ and the terminals $E^3 E^4$.

$E^6 E^7$ are supports which are fixed to the body B and which carry the insulating piece $E^5$.

$F^1$ is a thin window of flat glass interposed between the lenses $C^1 C^2$ and the body B. The window $F^1$ is so mounted as to be capable of sliding in its own plane so that it can be withdrawn laterally to a sufficient extent to allow of its being readily cleaned. The window $F^1$ is moreover of such a length in the direction of its sliding freedom that when it is drawn out for cleaning purposes the lenses $C^1 C^2$ are still protected by the window $F^1$ from smoke which may be contained in the smoke-chamber $B^1$.

$F^2$ is a window similar to $F^1$ and for a like purpose.

Radiation proceeding from the lamp-filament $A^1$ is rendered approximately parallel by passing through lenses $C^1 C^2$. The beam then traverses the windows $F^1 F^2$ without sensible deviation and is converged to form two separate images of the filament $A^1$ by the lenses $D^1 D^2$. Where the said two images are formed the respective sets of thermo-electric junctions $E^1 E^2$ are set. A screen or diaphragm not shown in the drawings can be adjusted to such a position between the lens $D^2$ and the thermo-electric junctions $E^2$ that the electromotive forces arising from the heating of these two sets of junctions just neutralize one another when the denseness of smoke within the smoke-chamber is such as corresponds to the greatest permissible density of smoke within the chimney.

G is a cover which can be secured upon the base $G^1$ so as to cover the apparatus in a dust-tight manner.

$G^2 G^2$ are windows of felt or the like closing holes in the cover G so that air freed from dust can be drawn into the apparatus as hereinbefore mentioned.

To enable accumulations of soot to be removed from the smoke-chamber $B^1$ suitable openings capable of being closed in a dust-tight manner may be made in the walls of the smoke-chamber $B^1$. Access to the interior of the chamber $B^1$ being gained by uncovering the said openings the soot from the chamber can be swept into the pipes $B^4 B^5$ and on removing the caps $B^6 B^7$ can be discharged from the apparatus. Provision may also be made for shutting off communication between the pipes $B^4 B^5$ and the smoke-chamber $B^1$ and for blowing steam or compressed air through the said pipes so as to clear them of soot. Alternatively in place of the aforesaid openings in the walls of the smoke-chamber $B^1$ the lens-systems $C^1 C^2$ and $D^1 D^2$ may be made removable so as to allow of access to the interior of the smoke-chamber $B^1$. For example a single support carrying the lamp A and the condenser $C^1 C^2 C^3$ may be so hinged to one end of the body B as to be capable of being swung outward for cleaning purposes and readily returned to a perfectly definite position in which it can be secured by a screw or other locking device. A second support similarly hinged and similarly returnable to a definite position in which it can be secured may be made to carry the lenses $D^1 D^2$ in their cell $D^3$ together with the thermo-electric system $E^1 E^2 E^3 E^4 E^5$. When the said hinged supports are employed those faces of the lenses $C^2 D^1$ which are presented towards the smoke-chamber $B^1$ are rendered accessible for cleaning so that the windows $F^1 F^2$ may be dispensed with.

Referring now to Fig. 2, $E^1$ represents one set of thermo-electric junctions on which is focused an image of the incandescent filament formed by radiation which has traversed the smoke-chamber aforesaid. $E^2$ represents the complementary set of thermo-electric junctions on which is focused an image of the incandescent filament formed by radiation which has traversed the air-chamber.

The metals from which the thermo-electric system $E^1 E^2$ is formed may be any two which constitute a pair of high thermo-electric power. For example, one of the metals may be copper and the other an alloy of copper and nickel in about equal parts by weight. The metals are preferably drawn in the form of fine wires which are afterwards flattened by rolling into thin narrow strips. In place of a single thermopile such as $E^1 E^2$ it is sometimes preferable to use two distinct thermo-piles supported so as to be adjustable independently of one another. In this case only one set of junctions of each thermopile is exposed to radiation and the two thermopiles are joined in series with the galvanometer the connections being such that the forces arising from the heating of the thermo-junctions by the two images of the glowing filament are opposed to one another.

H is the coil of a moving-coil galvanometer so connected in series with the thermo-electric system $E^1 E^2$ that when the heating of the junctions $E^2$ produces the predominant electro-motive force in the circuit, the resulting current causes a clock-wise deflection of the coil H and pointer $H^1$. In that case the pointer $H^1$ leaves the fixed stop K and approaches the wheel L between which and the spring-controlled brushes $L^1 L^2$ the pointer $H^1$ becomes engaged. The pointer $H^1$ is of metal but is insulated from the coil H so that the simultaneous contact of the brushes $L^1 L^2$ with the said pointer suffices to complete electrically a circuit comprising the battery M and electric bell N. It is thus evident that if the denseness of the smoke in the aforesaid smoke-chamber exceeds the permissible limit in accordance with which the apparatus has been adjusted, the electric bell N will be caused to ring.

What I claim as my invention and desire to secure by Letters Patent is—

1. In an apparatus of the character described, the combination of a source of radiation, means sensitive to radiation and adapted to receive the rays from said source, means for interposing the smoke in the path of some of said rays, while leaving the passage of the remaining rays unobstructed, and means actuated by said ray-receiving means adapted to sound an alarm when the smoke exceeds a certain denseness.

2. In automatic apparatus for detecting smoke and the like, the combination of a source of radiation placed so as to radiate through a sample of the smoke to be tested and balanced devices sensitive to radiation and having a part placed so as to receive radiation which has emanated from the said source and passed through the said smoke-sample whereby the said devices are unbalanced.

3. In automatic apparatus for detecting smoke and the like, the combination with a source of radiation, an element for gathering such radiation into a parallel beam, means for interposing in the path of such parallel beam a sample of the smoke to be tested, an element for reconcentrating the parallel beam to form an image of the said source of radiation, devices sensitive to radiation placed so as to receive the image, and alarm apparatus operatively connected with the said sensitive devices and adapted to give a signal automatically when the denseness of the smoke-sample exceeds its greatest permissible value.

4. In automatic apparatus for detecting smoke and the like, the combination of a source of radiation $A^1$, an adjustable support for said source of radiation, a condensing lens system $C^1 C^2$, a box B divided lengthwise by a partition $B^3$ into two chambers $B^1 B^2$, pipes $B^4 B^5$ leading respectively to and from the chamber $B^1$ and communicating with the source of smoke to be tested, lenses $D^1 D^2$ in the chambers $B^1 B^2$ respectively, two sets of thermo-electric junctions $E^1 E^2$ adjustably supported so as to receive the two images of the source of radiation formed by the lenses $D^1 D^2$, and a galvanometer connected in series with the two sets of thermo-electric junctions.

5. In automatic apparatus for detecting smoke and the like, the combination of a source of radiation $A^1$, an adjustable support for said source of radiation, a condensing lens system $C^1 C^2$, a box B divided lengthwise by a partition $B^3$ into two chambers $B^1 B^2$, pipes $B^4 B^5$ leading respectively to and from the chamber $B^1$ and communicating with the source of smoke to be tested, lenses $D^1 D^2$ in the chambers $B^1$ and $B^2$ respectively, two sets of thermo-electric junctions $E^1 E^2$ adjustably supported so as to receive the two images of the source of radiation formed by the lenses $D^1 D^2$, a galvanometer connected in series with the two sets of thermo-electric junctions, and a relay capable of being operated by the deflection of the galvanometer so as to cause a signal to be given automatically when the denseness of the smoke-sample exceeds its greatest permissible value.

In testimony whereof I have signed my name to this specification in the presence of two subscribing witnesses.

HORACE DARWIN.

Witnesses:
  HARRY B. BRIDGE,
  HERBERT BURRAGE.